Sept. 5, 1961 B. K. JAQUITH 2,998,722
CONTINUOUS WEIGHING MECHANISM FOR FLUIDS
Filed Jan. 9, 1957 3 Sheets-Sheet 1
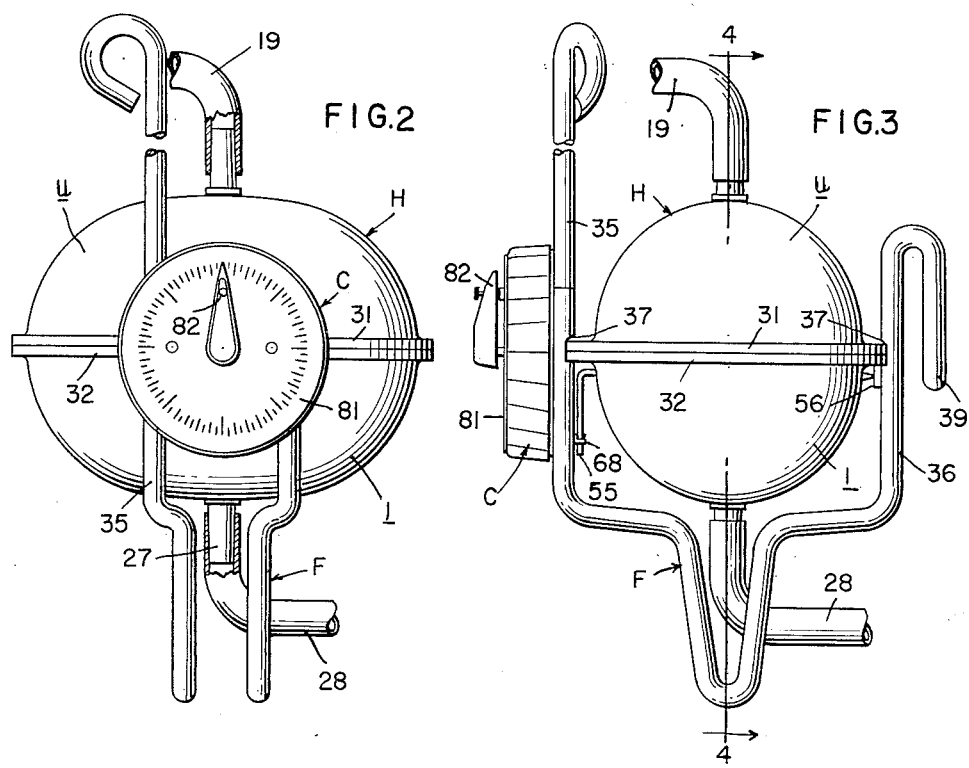
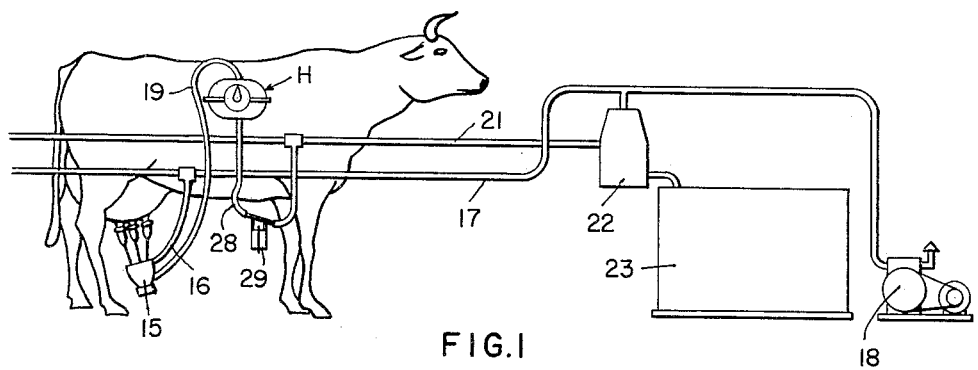
FIG.1
INVENTOR.
Burton K. Jaquith
BY
Shoemaker & Mattare
ATTYS Sept. 5, 1961 B. K. JAQUITH 2,998,722
CONTINUOUS WEIGHING MECHANISM FOR FLUIDS
Filed Jan. 9, 1957 3 Sheets-Sheet 2
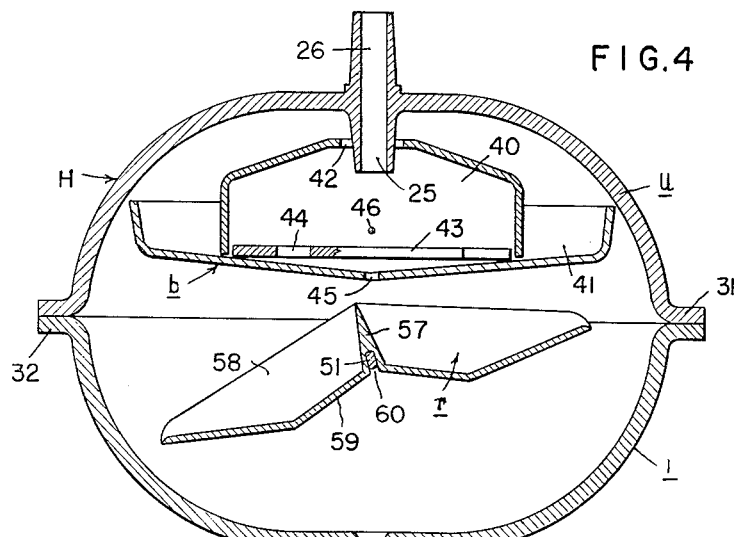
FIG.4
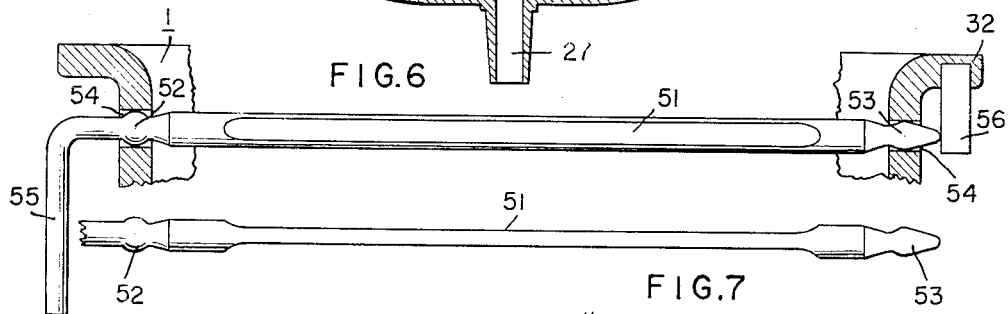
FIG.6
FIG.7
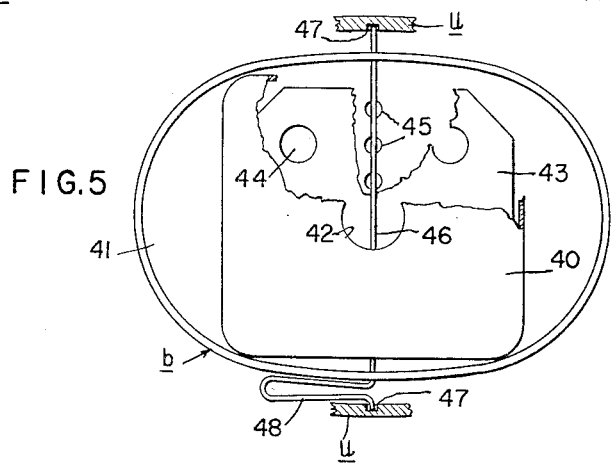
FIG.5
INVENTOR.
Burton K. Jaquith
BY
Shoemaker & Mattare
ATTYS

*INVENTOR.*
Burton K. Jaquith
BY Shoemaker & Mattare
*ATTYS*

United States Patent Office 2,998,722
Patented Sept. 5, 1961

2,998,722
CONTINUOUS WEIGHING MECHANISM FOR FLUIDS
Burton K. Jaquith, Fort Lauderdale, Fla., assignor to Technical Industries, Inc., Fort Lauderdale, Fla., a corporation of Florida
Filed Jan. 9, 1957, Ser. No. 633,287
18 Claims. (Cl. 73—219)

This invention relates to a scale mechanism for weighing fluid materials while in continuous motion. Such materials include liquids ranging widely in viscosity and characteristics, granular substances capable of being flowed, and various combinations thereof. As a specific example, the description to follow will be concerned with milk in its flow from the cow through the conduit system of a milking machine wherein a condition of minus pressure exists.

The objects and purposes of this invention are many. The materials to be weighed may differ widely in their physical and chemical characteristics. Their movements through the weighing mechanism may proceed at even speeds or be characterized by surges, pulsations, or otherwise. Also within the conduit system through which the materials are moved special atmospheric conditions, or off-normal pressures, either plus or minus, may prevail. There may also be present in the fluid material some air entrapment requiring elimination. It is of primary importance, therefore, that the weighing mechanism be capable of operating successfully in the presence of any such conditions. It should also be simple in construction, readily accessible as to all of its parts, and facile to disassemble and put together again so that thorough cleaning and sanitizing may be performed with a minimum of effort. The operation of weighing should furthermore be accurate and proceed relatively fast while the fluid material continues uninterruptedly in its movement through the conduit system. It is desirable also that the entire mechanism be durable, trouble-free, involve only the use of such materials as will not contaminate or adversely affect the fluids undergoing the weighing treatment, and be compact, light and easily portable for ready use with different conduit systems.

A clear understanding of the improvements which make up the present weighing mechanism may be gained from the detailed description to follow, taken in conjunction with the accompanying drawings which illustrate, as a specific example, an embodiment of this invention as designed for and applied to a typical closed conduit system starting with the claw at the udder of a cow and ending with a receptacle wherein the milk is accumulated.

In these drawings—

FIGURE 1 illustrates more or less diagrammatically a typical milk conduit system of the general kind with which the present weighing mechanism may be advantageously used;

FIG. 2 is a front elevation of the weighing mechanism per se;

FIG. 3 is a side elevation thereof;

FIG. 4 is an enlarged vertical section through the mechanism housing, taken on line 4—4 of FIG. 3, the supporting frame for the weighing mechanism being omitted from the view for clarity of illustration;

FIG. 5 is a top plan view of the baffle unit per se, portions of adjacent walls of the housing upper shell being shown in horizontal section;

FIG. 6 is an enlarged detail in side elevation of the rocker shaft shown in relation to certain openings in the walls of the housing (exhibited in section) wherein it is journaled for oscillatory movements;

FIG. 7 is a top elevation of the same shaft;

Similar reference characters are applied to the drawings to consistently designate corresponding parts throughout the several figures thereof.

Figure 10:
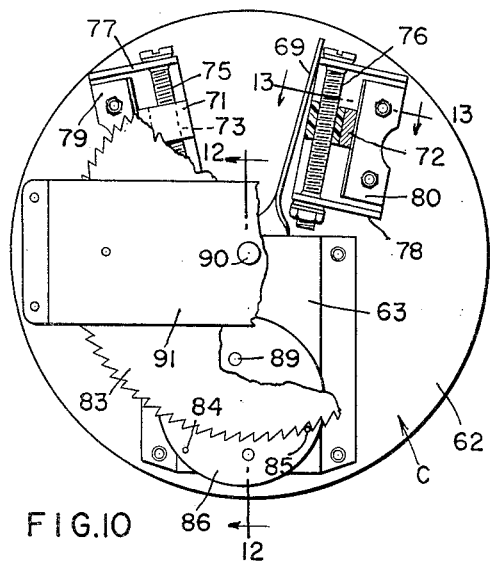
FIG. 10 is a front elevational view of the weight control and counter device from which the dial and face plate are omitted to exhibit other parts therebehind.

In FIGURE 1 I have illustrated a closed conduit system through which a pulsating fluid is drawn in response to operation of a vacuum pump. Such a system is more or less common with present day milking machines. It comprises a claw 15 having teat cups applicable to the udder of a cow and provided with a flexible connection 16 leading to the air line 17 and a vacuum pump 18; also a flexible connection 19 leading to the housing H of the present weighing mechanism which is interposed in the milk line 21 leading to a releaser 22 (for separating air from the milk) en route to the tank 23 wherein the accumulating milk is refrigerated and stored. Into and through such a conduit system which is closed and wherein a minus pressure is constantly maintained, the milk is drawn while pulsated in response to operation of the vacuum pump. To determine accurately the weight of the milk delivered at the source, i.e. the yield of the cow, while the milk is passing uninterruptedly to the storage tank, is the primary function of the present weighing mechanism in the particular environment illustrated in FIG. 1.

The weighing mechanism enclosed within the housing H comprises two complementary bowl-shaped shells, one upper $u$ and one lower $l$, defining between them an elongated closed chamber through which the fluid material is continuously circulated while weighed. At the top of the upper shell $u$ is an inlet in the form of a nipple extending both inwardly of the chamber at 25 and outwardly thereof at 26 to facilitate connection therewith of the flexible pipe 19 (see FIG. 1) leading to the conduit through which is flowed the fluid material to be weighed. An outlet nipple 27 provided at the bottom of the lower shell $l$ may be joined as by a flexible connection 28 (see FIG. 1) to the conduit line 21 to deliver the weighed material to the point of its discharge, such as the tank 23. A sampler 29 interposed in the connection 28 retains a true proportionate sample of the fluid material convenient for testing. Along their meeting edges the two shells are provided with out-turned flanges 31 and 32 which interengage to form a tight joint therebetween. A supporting frame F for the housing H is also provided and, as shown, this comprises a bar of round cross section bent to provide two pairs of spaced vertical legs front and rear, 35 and 36, respectively, arranged to receive between them the upper and lower shells $u$ and $l$ of the housing. These four legs are notched at 37 at points where they may engage coacting notches 38 in the out-turned shell flanges 31 and 32 to secure the two shells closely and firmly together (see FIG. 3). The upper end portions of the two rear legs 36 which are integral are formed into a down-turned hook 39 to facilitate attachment of the frame F and housing H to a bracket (not shown) affixed to the pipe stanchions or pipe lines which are commonly provided in milking parlors.

The upper shell $u$ accommodates within itself a baffle unit $l$ which, as shown, comprises an open-bottom baffle box 40 whose depending walls rest upon a baffle drain pan 41. At its top center the baffle box is apertured at 42 where it loosely surrounds the depending nipple 25 in spaced relation thereto. A baffle plate 43 which is confined within the depending walls of the baffle box 40 and rested loosely upon the baffle drain pan 41 is formed with openings 44 through which fluid material may drain into the pan. The baffle drain pan 41 itself is elongated in general conformity with the contour of the housing shells, and its bottom is pitched from opposite ends downwardly to its low point in the center which takes the form of a transversely extending shallow gutter wherein a plurality of aligned drain openings 45 are provided. The baffle unit $b$ wherein the incoming fluid first enters serves as a receiving station wherein deaeration and depulsing of the material takes place. While halted at this station, the fluid body is quieted and relieved of any entrapped air whose presence would otherwise tend to prevent a smooth even flow thereof. This is important in order that the scale mechanism presently to be described may function accurately and speedily.

Figure 8:
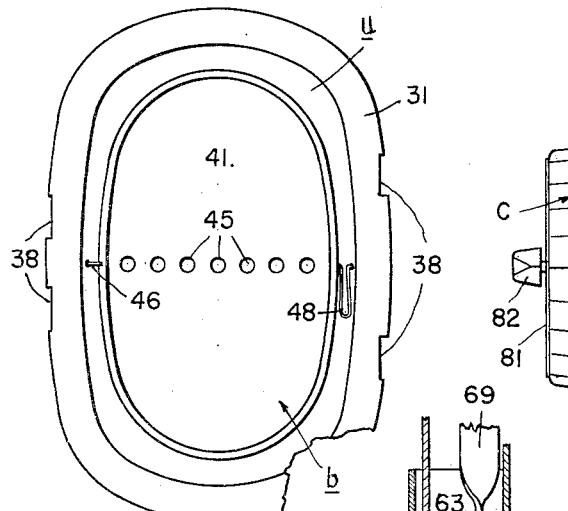
FIG. 8 is a bottom plan view of the housing upper shell together with the baffle unit positioned therein.
Figure 9:
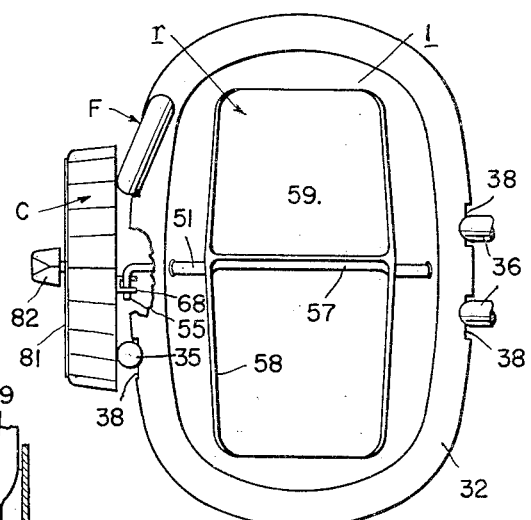
FIG. 9 is a top plan view of the housing lower shell together with the supporting frame therefor and the rocker tray therein.

The fluid material upon leaving the baffle unit $b$ descends through the drain openings 45 into a lower part of the housing chamber along a line which extends transversely thereof at the longitudinal center of the housing. To support the baffle unit in place, an elongated pin 46 is extended between opposite walls of the upper shell $u$ and through like walls of the baffle box 40 and baffle pan 41 wherein suitable openings are provided for the purpose. Opposite ends of this pin are rested within sockets 47 formed on the inner faces of the upper shell $u$ to provide support for the pin and its associated parts. One end portion of the pin (see FIG. 4 and 8) is formed into a spring handle 48 which, when compressed, pushes the opposite pin end portions away from each other for secure engagement within the supporting sockets 47; this handle also facilitates manipulation of the pin whenever the baffle unit $b$ is to be disassembled or reassembled for replacement within the housing. Manifestly each of the parts comprised in the baffle unit may be readily separated from the others for facile cleaning and sanitizing.

Within the lower shell $l$ is a scale receiver $r$ movable through a fixed path. In the embodiment shown, this receiver is in the form of an elongated tray mounted at its center point upon a rocker shaft 51 extending transversely of the housing. For the major portion of its length, through its center portion, the shaft 51 is flatted but opposite end portions are rounded out and formed into ovals or balls 52 and 53 of unequal diameters, each adapted for circular line engagement within aligned, closely surrounding, cylindrical bearings in the form of openings 54 which extend through the walls of the lower shell $l$. The oval 52 is slightly larger in diameter than is the oval 53 and the shaft end portion proximate thereto is turned transversely of its axis of oscillation to provide a crank arm 55. The opposite shaft end proximate to the smaller oval 53 abuts a post 56 which depends from the flange 32 of the lower shell $l$, the purpose being to provide an end thrust bearing therefor. In periods of non-operation the shaft may freely be removed from the lower shell $l$ by an endwise movement in a direction away from the post 56; but with the vacuum pump in operation to draw milk through the conduit system a sufficient minus pressure is maintained within the two shells of the housing H whereby the higher external pressure exerts a force upon the larger oval 52 in excess of that upon the smaller oval 53 to hold the shaft in the endwise position shown in FIGS. 3 and 6 where it is engaged with the post 56.

A partition wall 57 traversing the rocker tray $r$ centrally thereof is joined to side and bottom walls 58 and 59, respectively, thereby to define two fluid-tight compartments of identical capacity. The base of the partition wall 57 is widened to accommodate for its length a slot 60 open along its bottom to rest upon the flatted portion of the shaft 51 with whose opposite faces it is engaged non-rotatably. The cylindrical end portions of this shaft are disposed outwardly of the tray side walls 58 and serve as means to prevent shifting of the tray upon the shaft endwise thereof. The shaft-tray assembly is exactly balanced but with capacity for rocking movement between two fixed positions in either of which the bottom of the tray compartment which is down will be inclined downwardly to rapidly spill through its open end the fluid load that has previously been deposited therein.

FIG. 4 illustrates the receiver $r$ in discharge position for the compartment at its lower (left) end. While so positioned, the partition wall 57 is also inclined to the left so that its upper edge is disposed to the left of the drain openings 45 in the gutter of the baffle drain pan 41 thereabove; material flowing by gravity through these openings will accordingly be discharged into the tray upper compartment (to the right as shown in FIG. 4). Filling of this upper compartment starts after emptying of the lower compartment to the left has been well under way. All the fluid material in the lower (left) compartment will, therefore, been discharged therefrom before any considerable filling of the upper (right) compartment has taken place. By providing drain openings 45 of an aggregate area requisite for proper regulation of the flow of material passing therethrough, a complete emptying of the discharging (down) compartment can be assured before a predetermined weight of the material can accumulate within the receiving (upper) compartment. By this means each filling of the upper compartment will proceed to the point of depositing therein material having a predetermined weight so that it is possible to ascertain, with the aid of an accumulating counter device C (presently to be described), the exact quantity of material, by weight, which has flowed through the gutter openings 45 to move the receiver $r$ through its cycles during the entire period of operation.

With continued discharge of material through the gutter openings 45, the two-compartment scale receiver $r$ is repeatedly operated through its cycle to move between two positions in one of which the filled compartment is emptied and the other filled (but with very little time loss), and vice versa. However, the factors of speed and of accuracy must be constantly reckoned with, and without the provision of certain means to fix the time requisite for movement of the receiver $r$ between its two positions, the weighing mechanism would probably fall short of meeting many industrial requirements. The provision of such control means which constitutes one phase of this invention will now be described.

Figure 13:
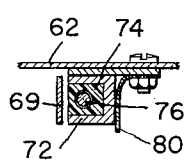
FIG. 13 is a similar view, taken on line 13—13 of FIG. 10.

Affixed to the front legs 35 of the frame F is a mounting plate 62 which carries a weight control and counter device C. This plate also supports a U-shaped bracket 63 whereon is pivotally mounted at 64 a magnet arm 65 in the general form of a strip. One end portion 66 of this arm is laterally turned to extend rearwardly through an arcuate slot 67 that is formed in the plate 62; the end 66 so projected through the mounting plate is bifurcated at 68 to receive the crank arm 55 of the receiver shaft whereby to transmit oscillatory movements thereto. The opposite end portion 69 of the magnet arm 65 is twisted through 90° to present its flat faces in confronting relation to a pair of spaced permanent magnets 71 and 72, each of U-shape in cross section (see FIG. 13) to accommodate a fixed plastic core. Through these cores 73 and 74 are extended traversing adjusting screws 75 and 76 which are rotatably supported in brackets 77 and 78, respectively. The axes of the screws 75 and 76 diverge from a point lying in a vertical plane which approximately intersects the pivotal axis 64 of the magnet arm 65, and at a point somewhat therebelow. By this arrangement the end portion 69 of the magnet arm is free to swing between the two magnets through a movement range that is determined by the brackets 77 and 78 which serve also as stops therefor. Angled spring strips 79 and 80 extending parallel with the adjusting screws 75 and 76 maintain a pressure engagement with the two magnets 71 and 72 in all adjusted positions thereof to prevent any loose play upon their mountings and assure against any deviation from the exact positions wherein they are adjusted.

FIG. 10 shows one position of adjustment wherein the brackets stop the end 69 of the magnet arm at points slightly spaced from the two magnets; by adjusting the screws 75 and 76 each magnet may be raised or lowered, and in consequence brought further toward or away from the magnet arm end 69 to thereby vary the air gap therebetween. It is possible, therefore, to increase or decrease the effective magnetic forces operable upon the magnet arm end 69 to influence its oscillations between the two bracket stops 77 and 78. This is important because this adjustment is the control over the weighing properties of the mechanism herein described.

Figure 11:
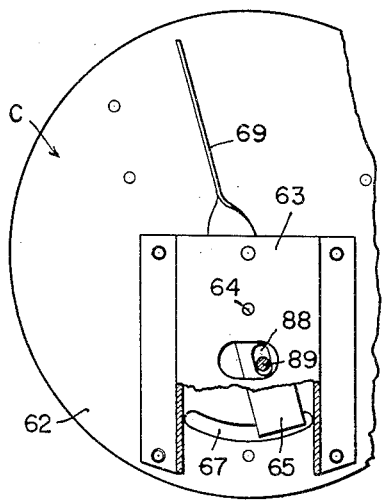
FIG. 11 is a similar view with the counter escapement wheel removed to expose additional parts, the magnets being also omitted from the view.
Figure 12:
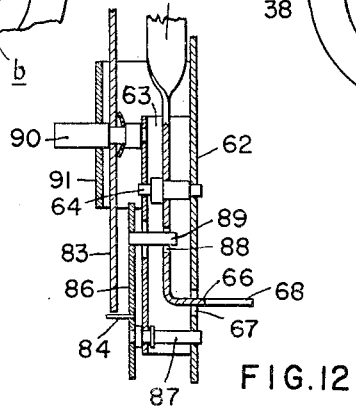
FIG. 12 is a detail in section, taken on line 12—12 of FIG. 10.

The counter device C may be of any approved type. The one here illustrated is equipped with a circular dial 81 around which a pointer 82 is moved to register, by weight, the quantity of fluid material that is passed through the weighing mechanism (see FIG. 2). This counter device comprises a toothed escapement wheel 83 certain of whose teeth are alternately engaged by a pair of pins 84 and 85 extending from a pawl 86 at the end of a shaft 87 which is pivotally supported by the mounting plate 62 and bracket 63 (see FIGS. 10–12). Oscillatory movements are transmitted from the magnet arm 65 wherein is a slot 88 engageable by a pin 89 which is extended therethrough from the pawl 86 for operation thereof. The escapement wheel 83 is frictionally secured upon a shaft 90 which is rotatably supported upon the bracket 63 and upon a second outer bracket 91 which is carried upon the mounting plate 62 (see FIGS. 10 and 12). At its outer end the shaft 90 carries fast the pointer 82 to advance the same around the dial 81. This pointer 82 may be manually reset to zero whenever desired, the escapement wheel then standing still while the shaft 90 is rotated to permit of such adjustment. By the means described, each movement of the receiver r transmits motion to the escapement wheel 83 to rotate it through the distance of one tooth and advance the pointer accordingly. The operating parts of the counter device C may be enclosed within a suitable case as is commonly done with such instruments.

The particular materials used for the different parts of the weighing mechanism should be carefully chosen with due regard for the nature and characteristics of the fluids to be circulated therethrough. For example, if milk be the fluid, then the important considerations of non-toxicity and sanitation will rule out many materials as unfit. Stainless steel is generally approved in this industry, and also certain plastic materials. For lightness, cleanability, and general serviceability the plastic known as methyl methacrylator polymer is entirely satisfactory for the two shells of the housing H, the baffle unit b and the receiver r. The property of lightness in relation to weight which inheres in such a plastic makes it especially desirable for the receiver with a view to minimizing its weight and consequent inertia when in operation. Inasmuch as this material is somewhat flexible, the walls of the housing H (if thin, as is desirable for purposes of weight reduction) will undergo flexure in response to operation of the vacuum pump, thereby tending to misalign the axes of the two cylindrical bearings 54. Any such flexure would also tend to create a binding pressure on the shaft 51 whose end portions are journaled for oscillatory movements therein. Any such effect is obviated, however, by rounding outwardly the shaft end portions into the two ovals or balls 52 and 53 which maintain a continuous circular line engagement within their bearings even though the housing walls may undergo flexure during periods of operation while maintaining their close fit within the supporting bearings therefor. For the baffle unit pin 46 and receiver shaft 51, stainless steel is an approved material where milk is the fluid to be weighed. Manifestly, where other and different fluids are to be passed through the weighing mechanism, there is a wide choice of materials available for the housing and all operating parts therewithin, provided only that they meet all the requirements, atmospheric and otherwise, imposed by the special conditions encountered in their use.

To attain a high degree of accuracy in the weighing operation, it is important that the factor of inertia in all movements of the scale receiver r be held to the minimum, and also that adjustable means, additional to gravity, be provided to accelerate and control all movements of the receiver between its receiving and discharging positions. The very light weight of the balanced scale receiver is relied upon to cancel out most of the inertia, and the provision of the pair of co-acting magnetic means 69 and 71 (or 72) serves effectively to speed the movements of the receiver between its two positions. The influence of the coacting magnetic means may readily be varied by proper adjustment of the adjusting screws 75 and 76, one or both of them, to widen or narrow the air gap between them thereby affecting the time interval required for operation of the receiver r through its cycle. Each movement of the receiver r is controlled by the magnets 71 and 72 and therefore the subsequent weight of that measure of fluid. In effect, the weight of the fluid in the one compartment of the receiver r is suspended by the magnetic attraction of the magnet 71 (or 72) for the magnet arm 69 through the interconnected mechanical linkage previously described. Since one of the inherent properties of a permanent magnet is a rapid and increasing reduction of magnetic attraction with only a slight increase in air gap, a relatively slight movement of the magnet arm 69 by the accumulated fluid reaching the predetermined weight supportable by the magnetic attraction, for all practical purposes leaves the filled receiver compartment unsupported. While the movement of the receiver r is relatively rapid, it is accelerated through its arc of travel since the movement of fluid toward the end of the compartment is continually moving the center of gravity of the contained fluid toward the discharge end of the receiver compartment. At the end of travel the fluid will completely drain from the receiver r with the opposing magnet then supporting the opposite compartment. It is the air gap between the magnet and magnet arm that determines the weight of the fluid contained in each compartment, and therefore the increase or decrease of that air gap, by adjusting movement of the screws 75 and 76, is the means of calibration to the desired weight. In practice, each movement of the receiver which is of a relatively short range starts off very fast and proceeds at an accelerating pace so that the fluid material entering the baffle means b of the housing is enabled to maintain a continuous flow therefrom into and out of the receiver r and on through the conduit system, all without interruption or variation in its flow rate while undergoing a concurrent weighing operation.

The frame F is desirably produced from an aluminum (or aluminum alloy) bar which is readily fashioned into the form herein described. Its front and rear legs have sufficient spring properties to securely hold the two housing shells u and l in assembled relation and, when spread further apart slightly, to release the shells for disassembly of all working parts of the weighing mechanism. The weight control and counter device C which is operatively connected to the receiver shaft crank arm 55 by the bifurcated slot 68 of the magnet arm 65 will readily disengage therefrom when the frame front legs 35 are pulled outwardly to release the housing H for removal from the frame F; conversely, when the lower shell l, complete with its receiver r in place, is reassembled with the upper shell u within the frame, the shaft crank arm 55 is free to reenter the bifurcation 68 of the magnet arm 65, thereby restoring the operative connection therewith, all with a minimum of time and effort. This is important inasmuch as it facilitates the operation of cleaning the various working parts of the weighing mechanism which, in many cases, is required periodically or oftener. The overall dimensions of the weighing mechanism are small, due largely to the simplicity and fewness of its several components and to the materials selected for the construction thereof, and its ready portability is attested by the fact that the weight of the entire mechanism complete, as commercially produced for the dairy industry, may be held to less than 5 lbs.

In summary, this invention is characterized by means which permits a weighing mechanism to operate continuously upon a fluid stream of indefinite length, moving at even speed or otherwise, while contained in a conduit system, for conditioning the fluid, when necessary, to assure an even and quiet flow thereof into and out of a gravity operated scale receiver, and for exercising close control over the quantity, by weight, of fluid that is accepted into the receiver for each operation thereof, all without any deviation from the normal flow rate of the fluid moving through the conduit system. Because of the several features of improvement herein disclosed, the present weighing mechanism which is compact, light and inexpensive is able to meet exacting requirements in numerous industries and provide a high degree of accuracy in the weighing of many different fluids.

I claim:

1. In a continuous weighing mechanism for fluids moving through a conduit, the combination of a housing providing a chamber having aligned cylindrical bearings carried by opposite walls thereof and formed at its top and bottom, respectively, with an inlet and an outlet, a receiver rockable through a fixed circular path and adapted in one predetermined position to receive fluid from the inlet and, when in a second predetermined position, to discharge the fluid by gravity for drainage through the outlet, a rotatable shaft whereon the receiver is mounted fast for said rocking movement with the turning of the shaft, the shaft and receiver being formed for cooperatively effecting said fast mounting while permitting the receiver to be freely separable from the shaft by a radial movement relative thereto, the shaft having end portions extended into the cylindrical bearings and having the portions lying in the bearings of outwardly rounded form and closely journaled in and engaging in annular line contact with the bearings for free rotation therein under conditions of varying distortion and relative movement of the areas of the housing walls having the bearings therein, and a counter device connected with the shaft for operation thereby with each rotary movement thereof.

2. In a continuous weighing mechanism for fluids moving through a conduit, the combination of a housing enclosing a chamber having an inlet and an outlet, a scale receiver positioned between the inlet and the outlet within the chamber, a rotatable shaft supporting the receiver for rocking movement through a fixed path between a first position wherein the receiver is adapted to receive fluid from the inlet and a second position wherein the fluid is discharged from the receiver for drainage through the outlet, a pair of coacting elements exteriorly of the housing comprising a magnet and an armature arm, one element being stationary relative to the housing and the other element having operative connection with the receiver for movement with the receiver and for movement toward and away from the said stationary element for controlling movements of the receiver between its two positions, and an adjustable mounting for one of the elements whereby to vary the air gap between itself and the other element to further control the receiver movements.

3. A continuous weighing mechanism according to claim 2, with a spring positioned adjacent to the said adjustably mounted one of said elements having continuous engagement therewith in all positions thereof to maintain said adjustably mounted element free of motion after adjustment.

4. The combination with a conduit through which fluids may be passed, of a continuous weighing mechanism for such fluids comprising a housing interposed in the conduit, the housing being formed of separable upper and lower shells joined in fluid-tight relation, a gravity operated scale receiver disposed within the housing to receive all the incoming fluid and then discharge the same intermittently therefrom, a unitary fluid weighing means and counter device positioned adjacent to and exteriorly of the housing, motion transmitting means extending from the scale receiver to the fluid weighing means-counter unit, and means fixedly supporting the fluid weighing means-counter unit on the housing, said means embodying spaced connected parts with the housing therebetween and said parts engaging opposite side portions of the housing and having an inherent resiliency exerting on both shells of the housing simultaneously a pressure to maintain the shells tightly together.

5. The combination with a conduit through which fluids may be passed in a continuous stream, of a continuous weighing mechanism for such fluids comprising a housing interposed in the conduit, a gravity operated scale receiver disposed within the housing to receive all the incoming fluid and then discharge the same intermittently therefrom, a shaft rotatably supported in the housing and in supporting and non-rotatable connection with the scale receiver and extending therefrom to a point exteriorly of the housing, a fluid weighing means and counter mechanism fixedly supported relative to and exteriorly of the housing in separable connection with the shaft for operation therewith and with the scale receiver, the weighing means comprising a magnet arm movable with the shaft and a magnet fixedly mounted in spaced relation to the magnet arm, the counter device being constructed to offer only an unvarying frictional resistance to the driving force originating with the scale receiver, and the fluid weighing means transmitting through the magnet arm and shaft a selected degree of force to the scale receiver tending to hold the scale receiver in one position and oppose the force of gravity acting thereon and on the contents thereof whereby to exert a greater torque effect upon said shaft when the combined weight of the receiver and contents become sufficient to pull the arm from the magnet.

6. The invention according to claim 5 with adjustable means for varying the air gap between the magnet and the magnet arm.

7. The combination with a conduit through which fluids may be passed, of a continuous weighing mechanism for such fluids comprising a housing interposed in the conduit, a gravity operated scale receiver disposed within the housing to receive all the incoming fluid passing therethrough, motion transmitting means connected with and extending from the scale receiver to a point exteriorly of the housing, the motion transmitting means comprising an endwise movable shaft whereon the scale receiver is non-rotatably mounted, a pair of aligned annular bearings of unequal diameters at opposite walls of the housing and having end portions of said shaft journaled therein, the bearing of larger diameter being extended through the proximate housing wall and the portion of the shaft journaled therein being rounded outwardly for circular line engagement therewith, interengaging means on the shaft and housing for limiting endwise movement of the shaft in one direction to a position wherein its outwardly rounded portion is disposed within the bearing therefor, and a vacuum producing mechanism in connection with the housing to maintain therein a minus pressure whereby the higher atmospheric pressure exteriorly of the housing exerts on the outwardly rounded portion of the shaft an axial force tending to hold the shaft in the endwise position wherein such outwardly rounded portion remains in engagement with the encircling surface of the bearing therefor.

8. The invention according to claim 7, wherein the bearing of smaller diameter is also extended through its proximate housing wall, the shaft end adjacent to the bearing of smaller diameter being exposed upon the exterior of the housing, and the said means for limiting endwise movement of the shaft being a thrust bearing in engagement with the exposed smaller end of the shaft.

9. The combination with a conduit through which fluids may be passed, of a continuous weighing mechanism for such fluids comprising a housing interposed in the conduit having walls susceptible of flexure in response to variable pressures therewithin, a pump in connection with the housing to draw fluid therethrough while maintaining a pulsating pressure condition therein, a gravity operated scale receiver disposed within the housing to receive all the incoming fluid passing therethrough, motion transmitting means connected with and extending from the scale receiver to a point exteriorly of the housing, the motion transmitting means comprising a shaft whereon the scale receiver is non-rotatably mounted, a pair of aligned cylindrical bearings at opposite walls of the housing wherein end portions of the shaft are journaled for rotation with capacity for endwise movement therein, one of the bearings being extended through the proximate wall of the housing and the shaft portion journaled in such extended bearing being rounded outwardly and maintaining a continuous circular line engagement with the encircling surface thereof in all flexed positions of the said housing wall and further closing communication through the encircling bearing between the interior and exterior of the housing, and stop means engageable with the shaft to limit its endwise movement in one direction to a position wherein the said outwardly rounded portion thereof is disposed within the bearing therefor.

10. The combination with a conduit through which fluids may be passed, of a continuous weighing mechanism for such fluids comprising an interposed housing having a pair of aligned cylindrical bearings of unequal diameter, each extending through one of two opposite walls of the housing, a gravity operated scale receiver disposed within the housing to receive all the incoming fluid passing therethrough, motion transmitting means connected with and extending from the scale receiver to the exterior of the housing, the motion transmitting means comprising a shaft having opposite end portions journaled for rotation within the wall bearings to be supported thereby and itself connected non-rotatably to the scale receiver to provide support therefor and be rotated thereby, the shaft portions lying within the two bearings being outwardly rounded to unequal diameters to engage the encircling surfaces in a circular line of contact, stop means engageable with the shaft to limit its endwise movement in one direction to a position wherein its outwardly rounded portions are disposed within the bearings therefor, and a vacuum producing mechanism in connection with the housing to maintain therein a minus pressure whereby the higher atmospheric pressure exteriorly of the housing exerts on the shaft rounded portion of the larger diameter an axial force to hold the shaft in the endwise position of engagement with the stop means therefor.

11. In a fluid system wherein is interposed a continuous weighing mechanism of the type which utilizes a gravity operated scale receiver supported for movement alternately between two positions and into which the fluid enters in the form of a continuous stream and from which it passes intermittently in said alternate movements in the form of separated batches, the improvement which consists in a weight regulating means comprising a magnet element and a coacting magnet arm element, means connecting one of said elements to the scale receiver to move therewith and in a fixed path, the other element being fixedly mounted with respect to said one element in said path, means for adjusting said other element toward and from said one element to vary the air gap between the elements whereby to exert on the movements of the scale receiver a selected degree of force opposing gravity, to hold the scale receiver until an amount of fluid has been received therein sufficient to overcome said holding force and release the receiver for movement whereby to accelerate operative movements of the of the scale receiver while reducing the flow rate effect thereon.

12. The invention according to claim 11, wherein the adjustment of said elements toward and away from one another is effected by mechanism comprising a rotatable screw in threaded engagement with one of the said elements, a mounting supporting the screw for free rotation while maintaining the screw against axial movement whereby to shift the position of the engaged element lengthwise of the screw, and a fixedly mounted spring in sliding contact with the said engaged element and exerting thereon a pressure force uniform in all adjusted positions of said element.

13. The invention according to claim 11, wherein the movement of the scale receiver is pivotal, means supporting said magnet arm element pivotally to oscillate about an axis located adjacent to one end thereof, an operative coupling between the said one end of the arm element and the scale receiver whereby pivotal movement of the scale receiver transmits oscillatory movement to the arm, and wherein the magnetic element is the said other element located in the path of movement of the said one of said elements which is the other end of the magnet arm element with capacity for relatively fast linear movement toward and away from the pivotal axis of the arm element concurrently with relatively slow angular movement from and toward the magnet arm element, respectively, whereby to increase the air gap between the elements when the magnet element recedes from the pivotal axis of the magnet arm element, and vice versa, to provide in effect a micro adjustment therefor.

14. In a fluid system having interposed therein a continuous weighing mechanism comprising a gravity operated scale receiver embodying a tray having two open top compartments, a shaft supporting said receiver for rocking movement and carrying a crank arm at one end, and a weight regulating means comprising an elongate arm, a pivot support for and connected to said arm adjacent to one end thereof, said one end of the arm being formed with a terminal portion adapted to have said crank arm operatively coupled therewith whereby rocking of the receiver imparts swinging movement to said elongate arm to move the other end of the latter in a prescribed path, and a pair of magnets mounted in spaced relation in said path with said other end of the elongate arm therebetween and functioning as an armature to be alternately attracted by the magnets.

15. The invention according to claim 14, with means supporting the two magnets for rectilinear adjusting movement along convergent paths which intersect at a point remote from the magnets and beyond the pivot support for the elongate arm whereby the air gap between the said other end of the elongate arm and the magnets may be altered to regulate the holding force of the magnets on the elongate arm in opposition to the force of gravity acting upon fluid contained in the receiver compartments.

16. The invention according to claim 15, wherein said supporting means for the magnets includes a pair of screws, means supporting each screw at its ends, and means threaded on each screw having a magnet mounted thereon.

17. The invention according to claim 15, wherein said supporting means for the magnets includes a pair of screws, means supporting each screw at its ends, means threaded on each screw having a magnet mounted thereon, and an elongate resilient element bearing against each magnet for holding the same against free movement after adjustment of the same on its supporting screw.

18. The method of continuously measuring a variably moving fluid stream while advancing through a fixed path wherein is interposed a pivoted, gravity-operated, scale receiver, which comprises interrupting the stream flow during its movement through the scale receiver for accumulation therein of a predetermined amount of fluid sufficient to generate the requisite gravity force for operation of the scale receiver and discharge therefrom of the fluid increment accumulated therein, and applying to the scale receiver a magnetic holding force supplementary to that of gravity, but in opposition thereto, to delay pivotal movement of the receiver until the amount of fluid accumulated therein is sufficient to overcome the supplementary holding force and free the scale receiver for an accelerated gravity-operated pivotal movement wherein the flow rate effect is minimized, thereby to assure successive discharge from the scale receiver of fluid increments all of substantially uniform amount.

References Cited in the file of this patent

UNITED STATES PATENTS

| | | |
|---|---|---|
| 778,887 | Pearce | Jan. 3, 1905 |
| 1,297,595 | Riley | Mar. 18, 1919 |
| 1,432,593 | Davison | Oct. 17, 1922 |
| 1,546,200 | Cavins | July 14, 1925 |
| 1,546,437 | Daysh | July 21, 1925 |
| 2,064,306 | Hapgood | Dec. 15, 1936 |
| 2,304,068 | Anderson | Dec. 8, 1942 |
| 2,305,557 | Pixton | Dec. 15, 1942 |
| 2,611,269 | Harstick et al. | Sept. 23, 1952 |
| 2,743,078 | Jordan | Apr. 24, 1956 |